(12) United States Patent
Holt et al.

(10) Patent No.: US 10,228,012 B2
(45) Date of Patent: Mar. 12, 2019

(54) BUSHING ASSEMBLY

(71) Applicant: ILLINOIS TOOL WORKS INC., Glenview, IL (US)

(72) Inventors: Jason Holt, Glenview, IL (US); Albert W. Van Boven, Glenview, IL (US); Glenn G. Heavens, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/200,820

(22) Filed: Mar. 7, 2014

(65) Prior Publication Data

US 2014/0186136 A1 Jul. 3, 2014

Related U.S. Application Data

(63) Continuation of application No. 12/517,458, filed as application No. PCT/US2007/086013 on Nov. 30, 2007, now abandoned.

(60) Provisional application No. 60/872,834, filed on Dec. 5, 2006.

(51) Int. Cl.
*F16B 41/00* (2006.01)
*F16B 43/00* (2006.01)
*F16B 5/02* (2006.01)

(52) U.S. Cl.
CPC ............... *F16B 43/00* (2013.01); *F16B 5/02* (2013.01); *F16B 41/002* (2013.01); *Y10T 16/05* (2015.01); *Y10T 16/088* (2015.01)

(58) Field of Classification Search
CPC ......... Y10T 16/05; F16B 19/02; F16B 41/002

USPC ....... 411/352, 353, 533, 107, 999, 546, 520, 411/528, 529, 339, 452, 479; 16/2.1
See application file for complete search history.

(56) References Cited

U.S. PATENT DOCUMENTS

| | | | |
|---|---|---|---|
| 2,056,309 A | 10/1936 | Osenberg | |
| 2,244,975 A | 6/1941 | Tinnerman | |
| 3,137,195 A * | 6/1964 | Rosenberg, Jr. | F16B 19/14 102/526 |
| 3,156,281 A | 11/1964 | Demi | |
| 3,322,001 A * | 5/1967 | Mele | 408/241 R |
| 4,193,434 A | 3/1980 | Wagner | |
| 4,286,894 A * | 9/1981 | Rongley | F16C 27/04 403/372 |
| 4,435,112 A * | 3/1984 | Becker | F16B 5/02 29/453 |
| 4,732,519 A | 3/1988 | Wagner | |
| 4,878,795 A | 11/1989 | Woodrow et al. | |
| 4,941,769 A | 7/1990 | Natsume | |
| 4,975,008 A | 12/1990 | Wagner | |
| 4,981,390 A * | 1/1991 | Cramer, Jr. | F16D 1/0835 403/355 |
| 5,190,269 A | 3/1993 | Ikeda et al. | |
| 5,474,346 A | 12/1995 | Fann et al. | |
| 5,645,282 A | 7/1997 | Belter | |
| 5,662,444 A | 9/1997 | Schmidt, Jr. | |
| 5,782,595 A | 7/1998 | Schneider | |

(Continued)

*Primary Examiner* — Flemming Saether
(74) *Attorney, Agent, or Firm* — Joseph M. Butscher; The Small Patent Law Group, LLC

(57) ABSTRACT

A bushing includes a cylindrical main body having a leading end and a trailing end, wherein a fastener passage is defined within the main body, and a plurality of ribs outwardly extending from the main body. The plurality of ribs are configured to securely position the bushing with respect to an opening formed in a component.

45 Claims, 9 Drawing Sheets

(56) References Cited

U.S. PATENT DOCUMENTS

| | | |
|---|---|---|
| 5,807,052 A | 9/1998 | Van Boven et al. |
| 6,030,161 A | 2/2000 | Udell et al. |
| 6,039,525 A * | 3/2000 | Johnson ................ F16B 41/002 |
| | | 411/353 |
| 6,044,536 A | 4/2000 | Schneider |
| 6,280,132 B1 | 8/2001 | Szczukowski et al. |
| 6,309,156 B1 | 10/2001 | Schneider |
| 6,309,157 B1 | 10/2001 | Amann et al. |
| 6,478,519 B1 * | 11/2002 | Genick, II ............ F16B 5/0258 |
| | | 411/353 |
| 6,561,312 B2 | 5/2003 | Stanienda |
| 6,582,171 B2 | 6/2003 | Bondarowicz et al. |
| 6,623,226 B2 | 9/2003 | Braun et al. |
| 6,634,841 B1 | 10/2003 | Heavens et al. |
| 6,663,330 B2 * | 12/2003 | Powell ......................... 411/546 |
| 6,688,826 B2 * | 2/2004 | Agha ................... F16B 41/002 |
| | | 411/107 |
| 6,769,851 B2 | 8/2004 | Agha et al. |
| 6,918,713 B2 | 7/2005 | Kramski |
| 7,004,704 B1 * | 2/2006 | Buytaert ................... B25C 1/18 |
| | | 411/441 |
| 7,059,022 B2 | 6/2006 | Yuta et al. |
| 7,073,997 B2 * | 7/2006 | Kovac ................... F16B 5/0258 |
| | | 411/353 |
| 7,210,885 B2 * | 5/2007 | Pinzl .................... F16B 37/005 |
| | | 411/353 |
| 7,241,095 B2 * | 7/2007 | Apsey ........................... 411/351 |
| 7,554,771 B2 * | 6/2009 | Hanrahan ............... F16C 27/00 |
| | | 360/265.2 |
| 7,580,225 B2 * | 8/2009 | Hanrahan ............... F16C 27/00 |
| | | 360/265.6 |
| 7,611,303 B2 * | 11/2009 | Hanrahan ............... F16C 27/02 |
| | | 403/367 |
| 7,815,408 B2 * | 10/2010 | Sessa ......................... F16B 5/02 |
| | | 411/301 |
| 8,057,122 B2 * | 11/2011 | Schneider .................. 403/408.1 |
| 2004/0042873 A1 | 3/2004 | Burmahln |
| 2008/0145179 A1 * | 6/2008 | Amann et al. ............... 411/378 |
| 2009/0110478 A1 | 4/2009 | Schneider |
| 2009/0317207 A1 | 12/2009 | Hartmann |
| 2014/0238334 A1 * | 8/2014 | Griffiths et al. ........ 123/196 CP |

* cited by examiner

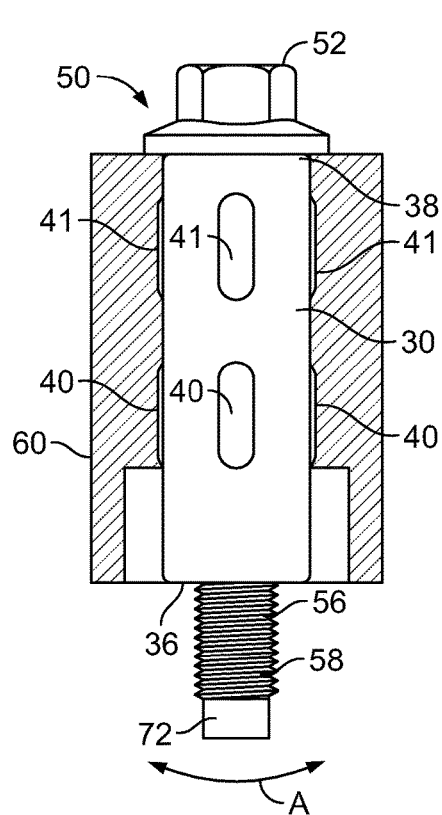
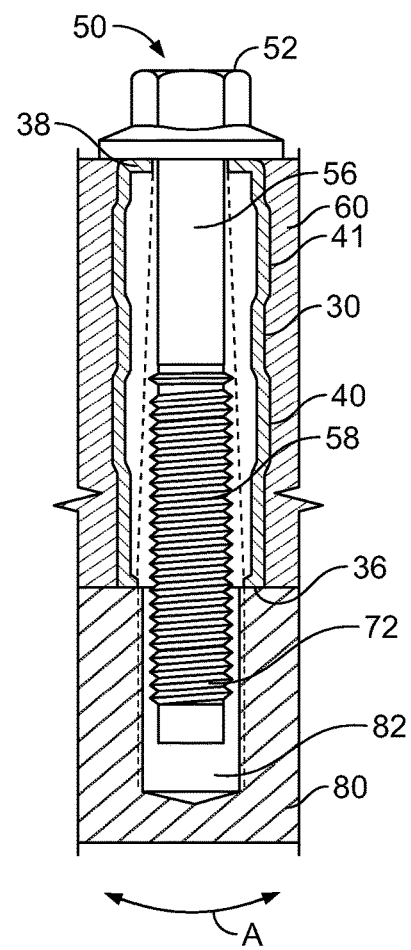
FIG. 11
FIG. 12

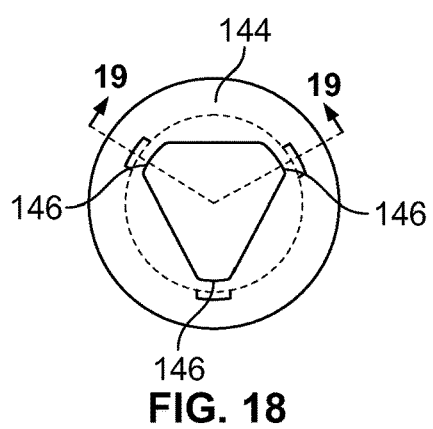
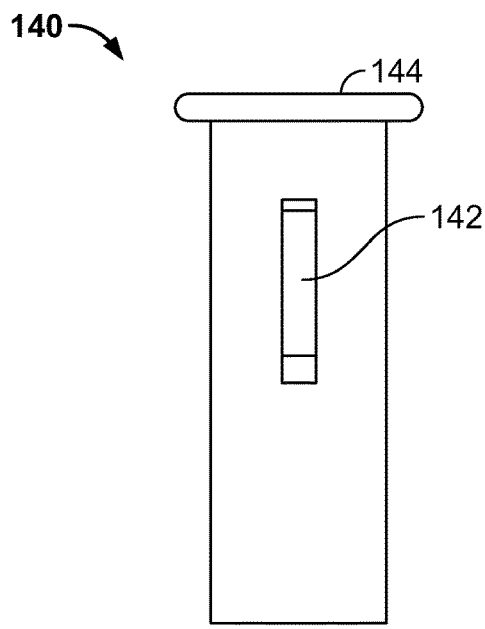
FIG. 17
FIG. 18
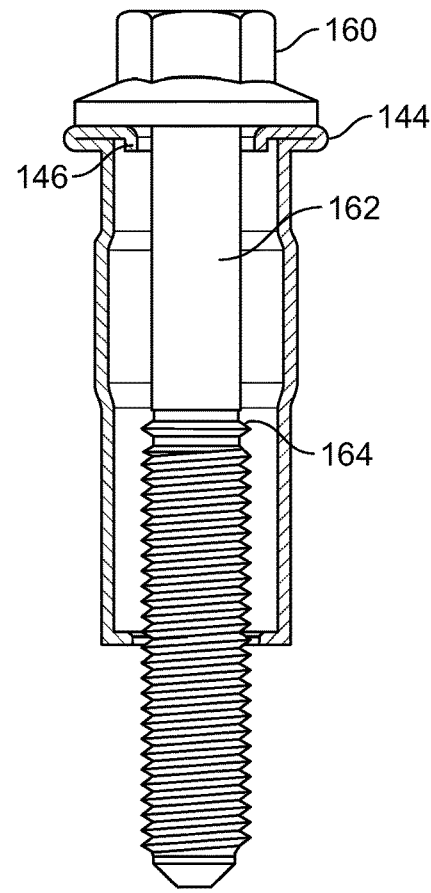
FIG. 19

BUSHING ASSEMBLY

RELATED APPLICATIONS

This application is a Continuation of U.S. patent application Ser. No. 12/517,458 filed Jun. 3, 2009, which is National Phase of International Application Number PCT/US07/086013 filed Nov. 30, 2007 and claims priority benefits from U.S. Provisional Patent Application No. 60/872,834 filed Dec. 5, 2006, the contents of all of these applications being incorporated herein by reference herein in their entirety.

FIELD OF THE INVENTION

Embodiments of the present invention generally relate to a bushing assembly, and more particularly to a bushing assembly (which may be formed through drawn metal or other types of fabrication) configured to securely retain a fastener, such as a bolt.

BACKGROUND OF THE INVENTION

In various applications, bushings are used when securing components together. For example, a bushing may be used with a bolt to secure a first component, such as a plastic housing cap, to a second component, such as a work-piece to which the housing cap is configured to be secured. Typically, the bushing is positioned within a hole of the first component and a screw or bolt is passed through the bushing to secure the first component to the second component.

FIG. 1 illustrates a cross-sectional view of a known bushing 10 being positioned within a component 12. The bushing 10 is generally cylindrical and includes an inner passage 14 configured to receive a fastener, such as a bolt or screw. A leading end 16 of the bushing 10 is positioned with a hole 18 formed in the component 12. The leading end 16 of the bushing 10 includes straight walls that are configured to be pressed into the component 12 and provide an interference fit with interior walls 20 of the component 12 that define the hole 16.

FIG. 2 illustrates a cross-sectional view of the known bushing 10 and bolt 22 being positioned within the component 12. The bolt 22 is positioned within the inner passage 14 of the bushing 10 such that a head 24 of the bolt 22 is supported by a trailing end 26 of the bushing 10. Because the outer walls of the bushing 10 interfere with the interior walls 20 of the component 12, frictional forces resist movement of the bushing 10 into the hole 18. Thus, a relatively large amount of force may be needed to secure the bushing 10 and bolt 22 in place with respect to the component 12. During this securing process, the bushing 10 may damage the interior walls 20 of the component 12. Moreover, the force needed to secure the bushing 10 and bolt 22 in place stresses the component 12 about the hole 18. If the component 12 is plastic, the component 12 may crack, snap or otherwise break due to the stress caused by the securing force.

FIG. 3 illustrates a close-up view of the leading end 16 of the known bushing 10 abutting the interior walls 20 of the component 12. As shown in FIGS. 1-3, the outer diameter of the leading end 16 of the bushing 10 is about the same size as, or larger than, the diameter of the hole 18. During insertion of the bushing 10 into the hole 18, the leading end 16 provides an edge that may snag the interior walls 20, thereby causing more stress and damage to the component 12. For example, the sharp leading end 16 may scrape, scratch, or otherwise dig into the interior walls 20, thereby making insertion of the busing 10 into the hole 18 more difficult.

FIG. 4 illustrates a cross-sectional view of the known bushing 10 fully secured within the component 12. As noted above, the process of inserting the bushing 10 into the component 12 stresses the component 12. Additionally, as shown in FIG. 4, a shaft 28 of the bolt 22 does not abut any portion of the bushing 10. Thus, the bolt 22 may shift with respect to bushing 10 before, during and after the securing process. A bolt moving within the bushing 10 may make alignment of the bushing 10 and bolt with respect to components more difficult.

SUMMARY OF THE INVENTION

Embodiments of the present invention provide a bushing that is easily positioned within a component. Embodiments of the present invention provide a bushing that is safely and securely anchored with respect to a component. Further, embodiments of the present invention provide a bushing that is less susceptible to damaging the component during an insertion process.

Certain embodiments of the present invention provide a bushing that includes a cylindrical main body having a leading end and a trailing end, wherein a fastener passage is defined within the main body, and a plurality of ribs outwardly extending from the main body. The plurality of ribs are configured to securely position the bushing with respect to an opening formed in a component.

An outer surface of the leading end may be rounded in order to prevent snagging, scraping or otherwise damaging the component. One or both of the leading and/or trailing ends may be inwardly flanged in order to retain a fastener. A plurality of fastener engaging members, such as lobes, tabs, indentations, or the like, may inwardly extend into the fastener passage proximate the trailing end. The plurality of fastener engaging members may be configured to abut a portion of a shaft of a retainer in order to retain the fastener. The fastener may be configured to pivot about an area where the plurality of fastener engaging members retain the portion of the fastener.

The plurality of ribs may include a first series of ribs located away from the leading end and a second set of ribs located away from the trailing end. A diameter of the leading end is less than a distance between two distally located ribs within the first series of ribs, wherein the diameter of the leading end is configured to allow for easy location and insertion with respect to the opening formed in the component. The diameter of the leading end may be less than a diameter of the opening of the component.

BRIEF DESCRIPTION OF SEVERAL VIEWS OF THE DRAWINGS

FIG. 11 illustrates a front view of a bushing assembly positioned within a component according to an embodiment of the present invention.

FIG. 12 illustrates a partial cross-sectional view of a bushing assembly securing components together according to an embodiment of the present invention.

FIG. 17 illustrates a front view of a bushing according to an embodiment of the present invention.

FIG. 18 illustrates a top view of a bushing according to an embodiment of the present invention.

FIG. 19 illustrates a partial cross-sectional view of a bushing assembly according to an embodiment of the present invention.

DETAILED DESCRIPTION OF THE INVENTION

Figure 1:
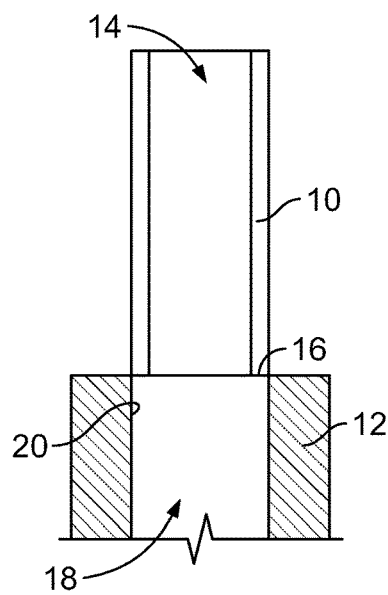
FIG. 1 illustrates a cross-sectional view of a known bushing being positioned within a component.
Figure 2:
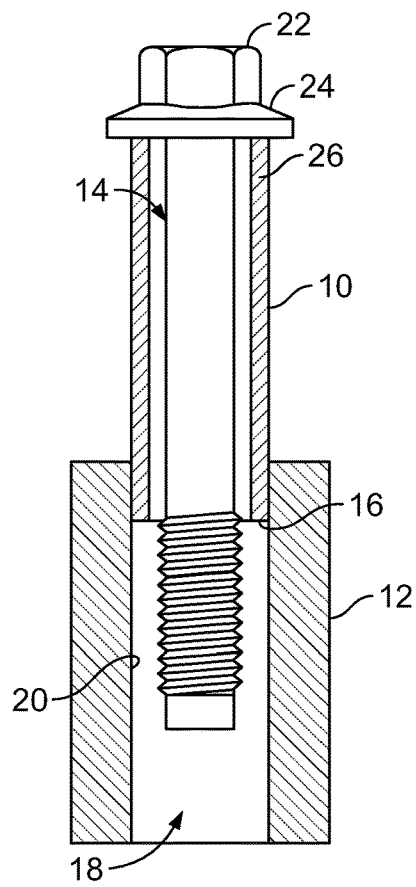
FIG. 2 illustrates a cross-sectional view of a known bushing and bolt being positioned within a component.
Figure 3:
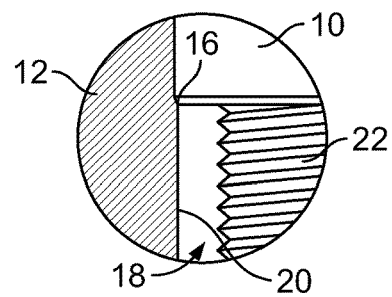
FIG. 3 illustrates a close-up view of a leading end of a known bushing abutting into interior walls of a component.
Figure 4:
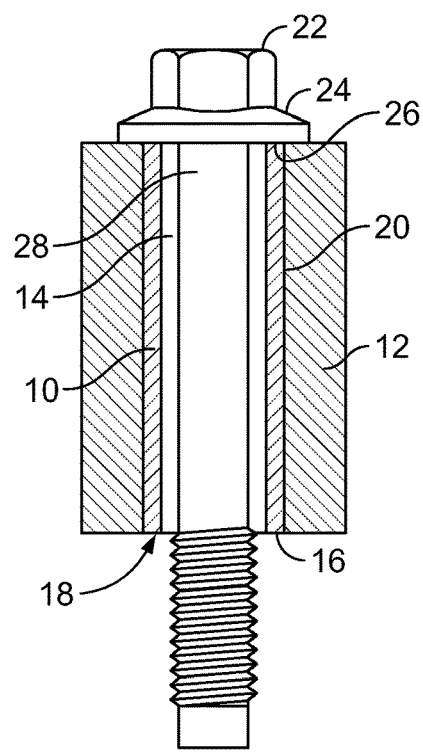
FIG. 4 illustrates a cross-sectional view of a known bushing fully secured within a component.
Figure 5:
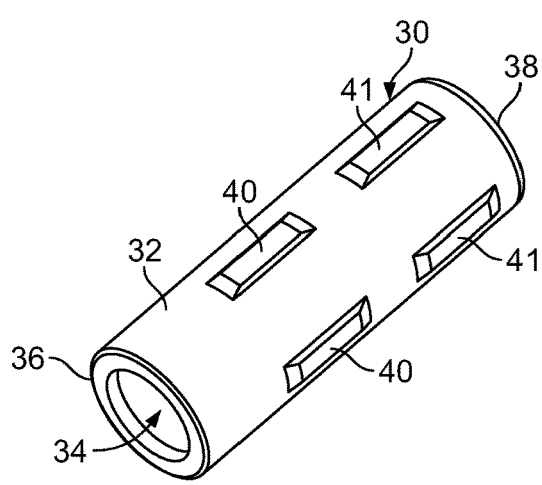
FIG. 5 illustrates an isometric view of a bushing according to an embodiment of the present invention.

FIG. 5 illustrates an isometric view of a bushing 30 according to an embodiment of the present invention. The bushing 30 may be formed of hardened thin wall material, which is in contrast to various conventional bushings that are formed from rolled thick wall material or solid stock. Thus, the bushing 30 is lighter than conventional bushings, while exhibiting similar strength.

The bushing 30 may be configured to be pushed into a molded hole of a component, or injection molded in place. The bushing 30 includes a generally cylindrical main body 32 defining an interior passage 34 that extends from a leading end 36 to a trailing end 38. The bushing 30 is configured to be positioned within an opening, hole, passage or the like a component, such as a plastic cap or the like. A series of stepped ribs 40 and 41 outwardly extend from the main body 32. As shown in FIG. 5, two series of ribs 40 are shown. One series includes horizontally aligned ribs 40, while the other series includes horizontally aligned ribs 41. The first series of ribs 40 are positioned a distance away from the leading end 36 while the second series of ribs 41 are positioned a distance away from the trailing end 38. More or less series or ribs than those shown may be used.

Figure 6:
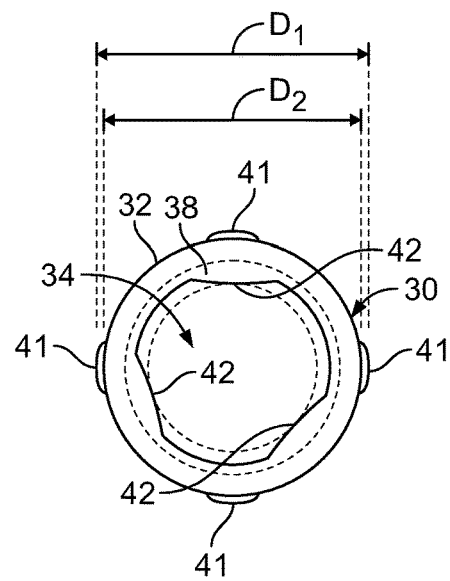
FIG. 6 illustrates a top plan view of a bushing according to an embodiment of the present invention.

FIG. 6 illustrates a top plan view of the bushing 30. The bushing 30 includes a series of inwardly-directed lobes 42. The lobes 42 extend inwardly from the main body 32 toward the interior passage 34. As shown in FIG. 6, the bushing 30 may include three lobes 42 equally spaced from one another. The lobes 42 are configured to securely retain a shaft of a bolt within the interior passage. The lobes 42 may be positioned at or proximate the leading and trailing ends 36 and 38, respectively. More or less lobes 42 than those shown may be used. Optionally, the lobes 42 may uniformly extend over the entire surface of the interior walls of the bushing 30.

As also shown in FIG. 6, the bushing includes four ribs 41 (and 40, which are hidden from view in FIG. 6) equally spaced about an outer surface of the main body 32. Each rib 41 (and 40) may be spaced 90° from the next closest rib 41. As shown in FIG. 6, the diameter $D_1$ spanning the distally located ribs 41 is greater than the diameter $D_2$ of the trailing end 38. Alternatively, more or less ribs 41 (and 40) at varying spacing may be used than those shown in FIG. 6.

Figure 7:
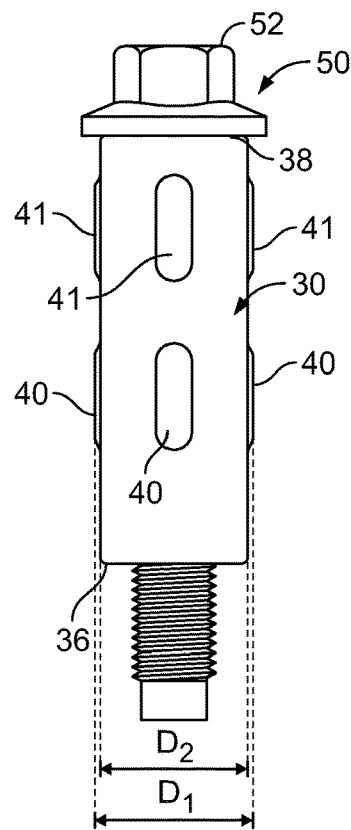
FIG. 7 illustrates a front view of a bushing assembly according to an embodiment of the present invention.

FIG. 7 illustrates a front view of a bushing assembly 50 according to an embodiment of the present invention. The bushing assembly 50 includes a fastener 52, such as a screw or bolt, positioned within the interior passage 34 (shown in FIGS. 5 and 6) of the bushing 30.

Figure 8:
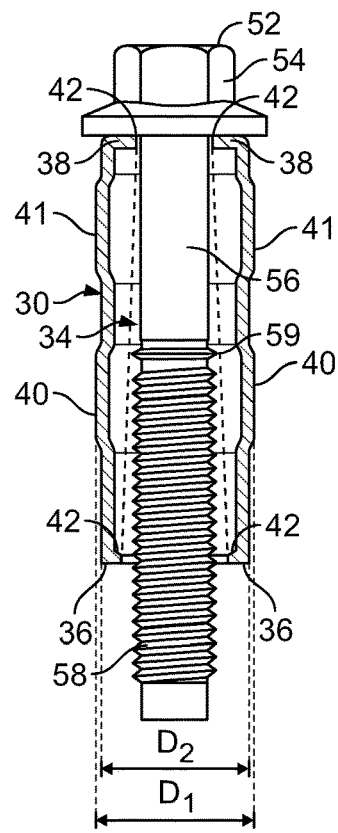
FIG. 8 illustrates a partial cross-sectional view of a bushing assembly according to an embodiment of the present invention.

FIG. 8 illustrates a partial cross-sectional view of the bushing assembly 50. The fastener 52 includes a head 54 integrally formed with a shaft 56 including a threaded area 58. An annular ring 59 outwardly extends from the shaft 56 above the threaded area 58. If the fastener 52 shifts upwardly with respect to the bushing 30, the annular ring 59 abuts against or into the lobes 42. As such, the lobes 42 prevent the fastener 52 from ejecting from the bushing 30 through the interaction with the annular ring 59. The head 54 is supported by the trailing end 38.

The leading and trailing ends 36 and 38, respectively, are inwardly flanged. The lobes 42 extend into the interior passage 34. The lobes 42 of the inwardly-flanged trailing end 38 abut outer surfaces of the shaft 56, thereby securely centering the fastener 52 in place with respect to the bushing 30, and, as noted above, preventing the fastener 52 from ejecting from the bushing 30 by engaging the annular ring 59 of the fastener 52 (if the fastener 52 shifts upward with respect to the bushing 30). Alternatively, the lobes 42 of the inwardly-flanged leading end 36 may also abut outer surfaces of the shaft 56. While only the leading and trailing ends 36 and 38, respectively, are shown to be inwardly-flanged in FIG. 8, other portions of the bushing 30 may also include inwardly-directed lobes. For example, the lobes 42 may extend from the leading end 36 to the trailing end 38 over the entire length of the bushing 30.

The fastener 52 is effectively captured or otherwise retained by the bushing 30 because the lobes 42 of the inwardly-flanged trailing end 38 surround the outer surfaces of the shaft 56 of the fastener 52. As shown in FIG. 8, the shaft 56 is captured about the trailing end 38, but may be free with respect to the leading end 36. As such, the fastener 52 may shift or pivot about the interface of the shaft 56 and the trailing end 38 in the directions of arc A. In this way, the bolt 52 remains securely positioned within the bushing 30, yet the distal end of the fastener 52 may shift during an alignment process with respect to a component, such as a work-piece. Thus, the fastener 52 may be easily located with respect to a hole of a component. Further, when the fastener 52 is secured to the work-piece, the bushing 30 automatically centers the fastener 52 due to the fact that the fastener 52 is centered and/or captured at the trailing end 38 of the bushing 30. It has been found that while the fastener 52 may shift or pivot during a hole or passage locating process, the securing process automatically corrects any shift and centers the fastener 52 due to the fact that the fastener 52 is surrounded by the bushing 30 at the trailing end 38.

Figure 9:
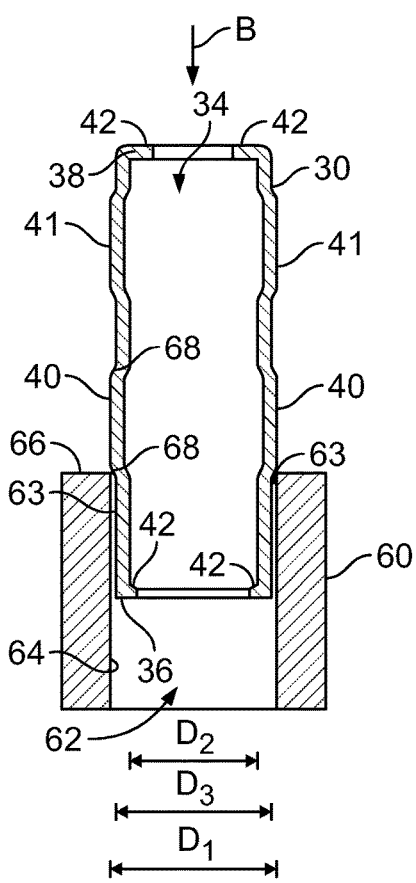
FIG. 9 illustrates a cross-sectional view of a bushing being positioned within a component according to an embodiment of the present invention.

FIG. 9 illustrates a cross-sectional view of the bushing 30 being positioned within a component 60 according to an embodiment of the present invention. The component 60 defines an opening 62 into which the bushing 30 passes. As shown in FIG. 9, a small gap 63 exists between outer surfaces of the leading end 36 and interior walls 64 that define the opening 62. Any plastic flash protruding from the component 60 may be collected within the gap 63. Because the diameter $D_2$ of the leading end 40 is smaller than the diameter $D_3$ of the opening 62, the bushing 30 may be easily located and initially positioned within the opening 62. The bushing 30 may be dropped into the opening 62 without the interior walls 64 interfering with the bushing 30. Little to no effort is used to drop the bushing 30 into an initial position with respect to the opening 62. This is in stark contrast to conventional bushings that require a relatively large and constant insertion force. Once the bushing 30 is initially positioned such that the ribs 40 abut a top surface 66 of the component 60, an increased amount of force is used to push the bushing 30 into the opening 62 in the direction of arrow B. The ends 68 of the ribs 40 (and 41) are rounded and smooth. Thus, the ribs 40 and 41 do not dig, scrape, damage or overly stress the component 60 during the insertion process.

As the bushing 30 is pressed into the component 60 in the direction of arrow B, the ribs 40 and 41 securely anchor into the interior walls 64 of the component 60. The ribs 40 and 41 press into the interior walls 64, thereby providing a secure fit between the bushing 30 and the component 60. The bushing 30 is anchored into the component 60 at areas proximate the ribs 40 and 41, instead of an interference fit between the entirety of the bushing 30 and the interior walls 64. Thus, it has been found that the bushing 30 causes little stress to the component 60. Overall, the ribs 40 and 41 provide a low stress press fit with respect to the component 60.

Figure 10:
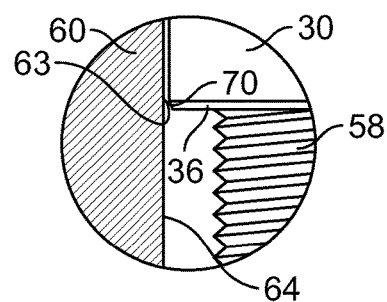
FIG. 10 illustrates a close-up view of a leading end of a bushing within a component according to an embodiment of the present invention.

FIG. 10 illustrates a close-up view of the leading end 36 of the bushing 30 within the component 60. As shown in FIG. 10, an outer surface 70 of the leading end 36 of the bushing 30 is coined, rolled, folded, or otherwise rounded. Thus, the leading end 36 is not susceptible to digging into or snagging the interior wall 64 of the component 60. Instead, if shifted into the interior wall 64, the smooth, rounded outer surface 70 of the leading end 36 slides over the interior wall 64.

FIG. 11 illustrates a front view of the bushing assembly 50 positioned within the component 60. The ribs 40 and 41 act to securely center the bushing 30 within the component 60. That is, while the leading end 36, which has a smaller diameter than the opening formed in the component 60, may shift inside the component 60 during a locating process, the ribs 40 and 41 center and anchor the bushing 30 within the component as the bushing 30 is urged into the component 60.

As discussed above, the distal end 72 of the fastener 52 may shift or pivot about the interface of the shaft 56 and the trailing end 38 of the bushing 30. Thus, the process of locating the fastener 52 with respect to a hole or opening of another component is made easier.

The shape of the bushing 30 allows plastic of the component 60 to creep or otherwise slowly flow around the drawn ribs 40 and 41 after insertion. This assists in retaining the bushing 30 firmly in position.

FIG. 12 illustrates a partial cross-sectional view of the bushing assembly 50 securing components 60 and 80 together according to an embodiment of the present invention. The component 80 includes an opening 82 into which the distal end 72 of the fastener 52 is located and retained. During the locating process, the distal end 72 may shift or pivot, as discussed above, in order to make it easier to position the fastener 52 within the opening 82. As the fastener 52 is tightened, thereby securing the components 60 and 80 together, the bushing assembly 50 automatically aligns and centers the fastener 52 with respect to the components 60 and 80. That is, if the fastener 52 is shifted during the locating process, the shift is corrected during the securing process. Thus, if during the locating process, the fastener 52 shifts 5° along arc A, that shift is reversed as the fastener 52 is tightened. For example, as the fastener 52 is tightened, the leading end 36 abuts the top surface of the component 80, thereby automatically aligning the fastener 52 within the opening 82. If the leading end 36 is angled with respect to the top surface of the component 80 during the locating process, the leading end 36 automatically becomes flush with that top surface as the threaded area 58 of the fastener 52 continues to threadably engage reciprocal surfaces of the component 80 that surround the opening 82.

Figure 13:
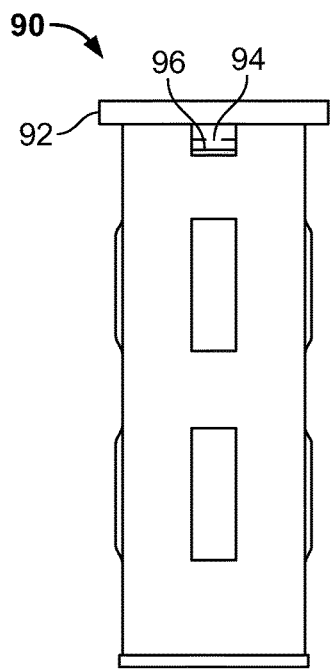
FIG. 13 illustrates a front view of a bushing according to an embodiment of the present invention.

FIG. 13 illustrates a front view of a bushing 90 according to an embodiment of the present invention. The bushing 90 is similar to the bushing 30 shown in FIG. 5, except that the trailing end 92 is outwardly flanged, forming a wider base on which a fastener may rest. Additionally, slots 94 are formed in the bushing 90 proximate the outwardly flanged training end 92. The cut material is then canted inwardly and downwardly to form fastener engaging members, such as canted tabs 96. Thus, less material is used to form the fastener centering tabs 96 than the lobes 42 (shown in FIGS. 6 and 8).

Figure 14:
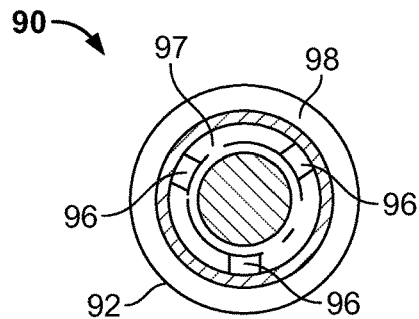
FIG. 14 illustrates a top view of a bushing according to an embodiment of the present invention.

FIG. 14 illustrates a top view of the bushing 90. As shown in FIG. 14, the inwardly canted fastener centering tabs 96 act to center a fastener shaft within the central passage 97 of the bushing 90. As noted above, the outwardly flanged trailing end 92 forms a wider base 98 for a fastener head to abut.

Figure 15:
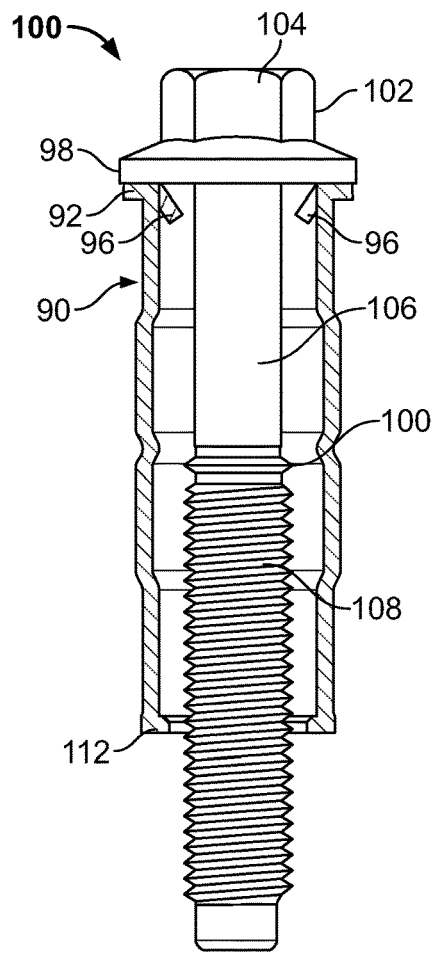
FIG. 15 illustrates a partial cross-sectional view of a bushing assembly according to an embodiment of the present invention.

FIG. 15 illustrates a partial cross-sectional view of a bushing assembly 100 according to an embodiment of the present invention. The bushing assembly 100 includes the bushing 90 and a fastener 102 having a fastener head 104 integrally connected to a shaft 106 having a threaded portion 108 and annular ring 110 above the threaded portion 108. As shown in FIG. 15, the outwardly flanged trailing end 92 provides the wide base 98 that supports the head 104. The fastener centering tabs 96 are inwardly and downwardly canted so as not to dig into the shaft 106. Moreover, the fastener centering tabs 96 act to snag the annular ring 110, as discussed above, if the fastener 102 upwardly shifts.

Additionally, the leading end flange 112 may be larger than those described above. The enlarged leading end flange 112 increases bearing surface area with respect to the fastener and a component into which the bushing 90 is positioned.

Figure 16:
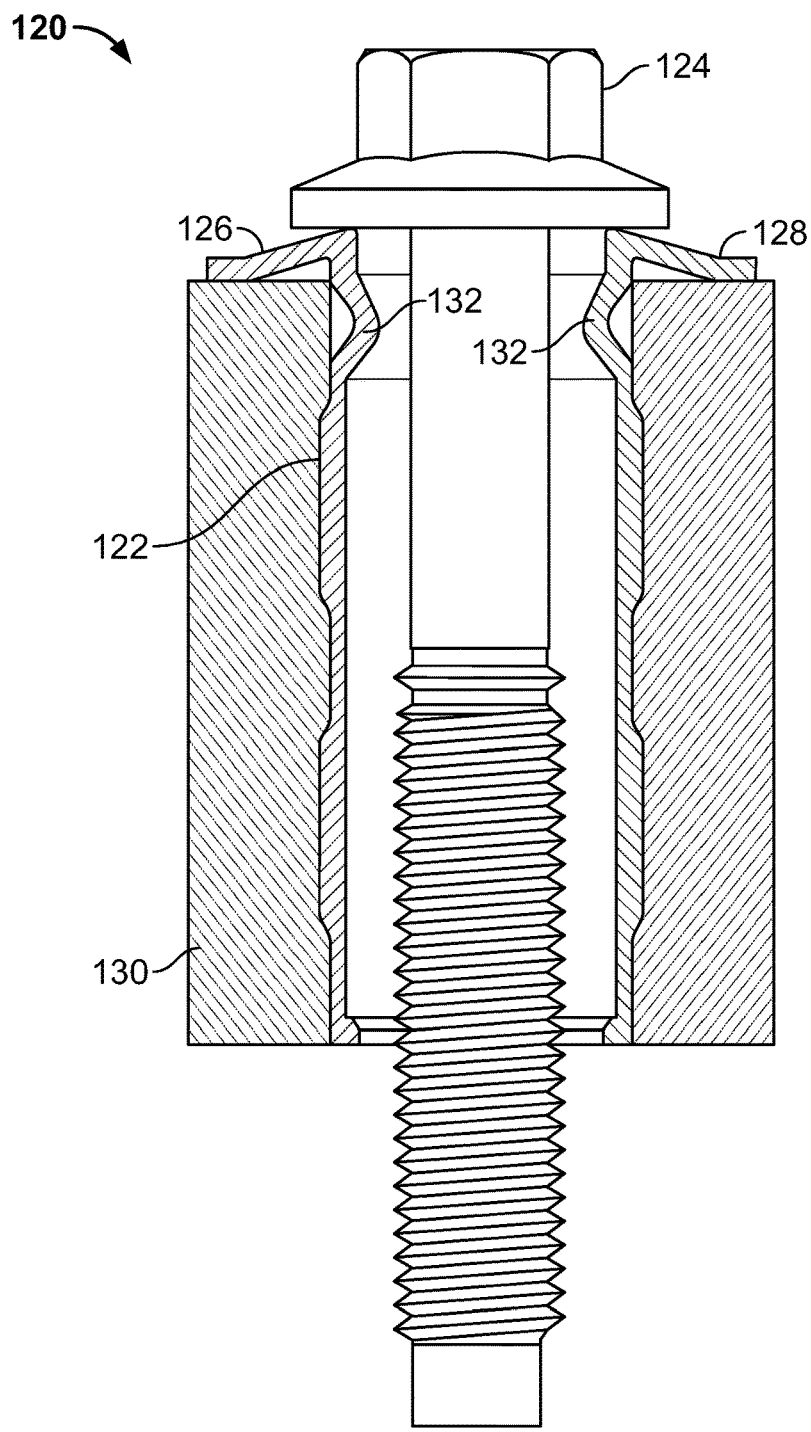
FIG. 16 illustrates a partial cross-sectional view of a bushing assembly according to an embodiment of the present invention.

FIG. 16 illustrates a partial cross-sectional view of a bushing assembly 120 according to an embodiment of the present invention. The bushing assembly 120 includes a bushing 122 and a fastener 124, similar to those described above. However, the trailing end 126 of the bushing 122 includes a spring-biased flange 128 that adjusts when the component 130, bushing 122 and/or fastener 124 thermally expand and/or when the fastener 124 is over-torqued. For example, if the component 130 and/or bushing 122 expands, the spring-biased flange flexes accordingly to ensure that the bushing 122 and the fastener 124 remain secured within the component 130. Similarly, if the fastener 124 is over-torqued, the spring-biased flange 126 may flatten out to accommodate the over-torqued condition.

Additionally, instead of lobes or cut-out portions, the bushing 122 may include fastener engaging members that are indented portions 132. The indented portions 132 may be formed by crimping or other such methods. The indented portions 132 act to center and secure the fastener 124 similar to the lobes 42 (shown in FIGS. 6 and 8) and the fastener centering tabs 96 (shown in FIGS. 13-15).

FIG. 17 illustrates a front view of a bushing 140 according to an embodiment of the present invention. As shown in FIG. 17, the bushing 140 includes only one series of ribs 142, but may include more than those shown. Additionally, the bushing 140 includes a wide trailing end flange 144.

FIG. 18 illustrates a top view of the bushing 18. The trailing end flange 144 is rolled over itself and then a tri-lobe shape 146 is drawn on top. The rolled, drawn tri-lobe shape 146 is an optional way of forming lobes or fastener-centering members that center and capture a fastener (as discussed above).

FIG. 19 illustrates a partial cross-sectional view of a bushing assembly 150 according to an embodiment of the present invention. As shown in FIG. 19, the trailing end flange is rolled over itself and drawn to form a base for the fastener head 160 and also the tri-lobe shape 146 that is configured to center the fastener shaft 162 and latching onto the annular ring 164 if the shaft 162 shifts upward.

Figure 20:
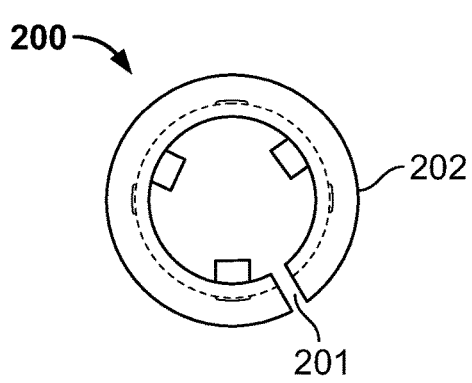
FIG. 20 illustrates a top view of a bushing according to an embodiment of the present invention.
Figure 21:
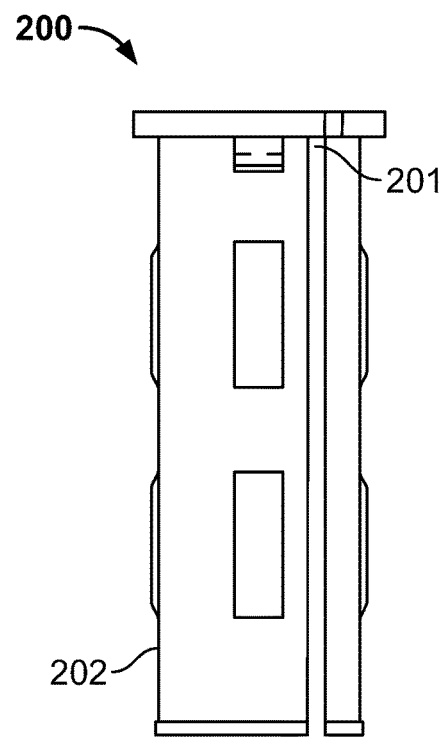
FIG. 21 illustrates a front view of a bushing according to an embodiment of the present invention Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

FIGS. 20 and 21 illustrate top and front views, respectively, of a bushing 200 according to an embodiment of the present invention. The bushing 200 is similar to the bushing 90 shown and described with respect to FIGS. 13-15, except that the bushing 200 includes a split-column design that provides a higher tolerance. That is, a gap 201 is formed in the column 202 of the bushing 200. The gap 201 allows the column 202 to expand and contract. When the bushing 200 is positioned around a component, such as a fastener, the gap 201 allows the column 202 to radially expand to fit around the component. Once the column 202 is positioned around the component, the column flexes back. As shown in FIG. 21, the gap 21 extends over the height (or length, depending on the orientation) of the bushing 200.

Thus, embodiments of the present invention provide a bushing that is easily positioned within a component. The ribs of the bushing securely anchor the bushing within the component. Additionally, the bushing is not susceptible to damaging the component during an insertion process. Further, the bushing securely retains and centers a fastener therein.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. An assembly, comprising:
   a first component including a hole;
   a mating component, that mates against the first component; and
   a bushing including:
   a cylindrical main body having a leading end and a trailing end, wherein a fastener passage is defined within said main body;
   a plurality of lobes extending inward from the main body into the fastener passage and extending from the leading end to the trailing end; and
   at least two outwardly extending members extending in an elongated fashion along the outer surface of the cylindrical main body in a longitudinal direction of the main body, wherein
   the bushing is a monolithic component,
   the bushing is interference fitted in the hole of the first component from a side opposite the mating component,
   the cylindrical main body has an outer diameter that is smaller than an inner diameter of the hole of the first component,
   an extrapolated circular circumference established by respective outward-most surfaces of the at least two outwardly extending members extending about the longitudinal axis and lying on a plane normal to the longitudinal axis that also extends through the outwardly extending members has a diameter that is greater than the inner diameter of the hole.

2. The assembly of claim 1, comprising:
   a bolt retained in the bushing.

3. The assembly of claim 2, wherein:
   the assembly is configured such that the bushing shifts location in the hole of the first component when partially inserted therein during tightening of the bolt in a hole the hole of the mating component, thereby axially aligning the bushing with the hole of the first component.

4. The assembly of claim 1, wherein a diameter of the bushing at the trailing edge is the same as the diameter of the bushing at the leading edge.

5. The assembly of claim 1, wherein the hushing is configured such that a constriction is located at least one of at or proximate the trailing edge.

6. The assembly of claim 5, wherein the constriction is an indentation in the cylindrical main body that extends inward from the main body into the passage.

7. The assembly of claim 5, comprising:
   a bolt retained in the bushing.

8. The assembly of claim 1, wherein the least two outwardly extending members extending in the longitudinal direction respectively correspond to ribs, wherein the ribs have three sections, including:
   a first section extending outwardly and downwardly from an outer cylindrical surface of the main body;
   a second section elongatedly extending downwardly and axially from the first section; and
   a third section extending downwardly and inwardly from the second section.

9. The assembly of claim 8, wherein outermost portions of the ribs comprise respective elongate smooth surfaces extending parallel to a longitudinal axis of the bushing.

10. The assembly of claim 9, wherein the first section extends at a rise to run that is no more than about one, wherein the rise corresponds to outward extension.

11. The assembly of claim 1, wherein the extending members of the at least two outwardly extending members are substantially equally spaced apart from one another about an axial direction of the bushing.

12. The assembly of claim 1, wherein there are at least three outwardly extending members, at least two of the outwardly extending members being axially aligned with one another.

13. The assembly of claim 1, wherein the leading edge and a trailing edge of the bushing have the same outer diameters, which diameters are less than an outer diameter of any of the at least two outwardly extending members.

14. The assembly of claim 1, wherein the bushing has a uniform wall thickness lying on respective planes normal to a longitudinal axis of the bushing at a location where the at least two outwardly extending members extend and at a location away from the least two outwardly extending members.

15. The assembly of claim 1, further comprising:
   a fastener having a head integrally formed with a shaft, the fastener extending through the fastener passage.

16. The assembly of claim 1, wherein
   the at least two outwardly extending members are configured to securely anchor the bushing within the hole.

17. The assembly of claim 1, wherein: the bushing is a drawn metal bushing.

18. The assembly of claim 1, wherein: the mating component is a plastic component.

19. The assembly of claim 1, wherein:
   the mating component extends towards the hushing around the at least two outwardly extending members.

20. A bushing comprising:
   a cylindrical main body having a leading end and a trailing end, wherein a fastener passage is defined within said main body;
   a plurality of lobes extending inward from the main body into the fastener passage and extending from the leading end to the trailing end; and
   a plurality of ribs outwardly extending from said main body, said plurality of ribs being configured to securely position the bushing with respect to an opening formed in a component;
   wherein each of the plurality of ribs has three sections, including
      a first section elongatedly extending outwardly and downwardly from an outer cylindrical surface of the main body,
      a second section extending downwardly in an elongated fashion and axially from the first section, and
      a third section extending downwardly and inwardly from the second section, wherein said leading end is flanged inward and said trailing end is flanged inward, and the bushing is configured to be press fit into a hole of a component, wherein the direction of press fitting is such that the leading end leads the bushing into the hole.

21. The bushing of claim 20, wherein outermost portions of the ribs comprise respective elongate smooth surfaces extending parallel to a longitudinal axis of the bushing.

22. The bushing of claim 21, wherein the first section extends at a rise to run that is no more than about one, wherein the rise corresponds to outward extension.

23. The bushing of claim 20, wherein said plurality of ribs comprises a first series of ribs located away from said leading end and a second series of ribs located away from said trailing end.

24. The bushing of claim 20, wherein said plurality of ribs comprises a first column of ribs including a plurality of ribs, the first column being aligned with the longitudinal axis of the bushing.

25. The bushing of claim 24, wherein said plurality of ribs comprises a second column of ribs including a plurality of ribs, the second column being aligned with the longitudinal axis of the bushing and being spaced axially apart from the first column.

26. The bushing of claim 20, wherein the first section has a slope that is no more than about one with the longitudinal direction of the bushing corresponding to the horizontal direction of the slope.

27. The bushing of claim 20, wherein said diameter of said leading end is configured to be less than a diameter of the opening of the component.

28. The hushing of claim 27, wherein the plurality of ribs are arrayed axially about the longitudinal axis of the bushing, wherein an extrapolated circular circumference established by surfaces of the second sections extending about the longitudinal axis of the hushing and lying on a plane normal to the longitudinal axis that also extends through the second sections of the plurality of ribs has a diameter that is greater than the diameter of the opening of the component.

29. An assembly, comprising:
   a first component including an opening therein;
   a second component including a hole therein; and
   the bushing of claim 20, wherein,
   the assembly is configured such that the bushing shifts location in the opening of the first component when partially inserted therein during tightening of a bolt into the hole of the second component, thereby axially aligning the bushing with the opening of the first component.

30. The hushing of claim 20, wherein the bushings have ends with maximum outer diameters that are the same.

31. The bushing of claim 20, wherein the ribs are the outermost components of the bushing with respect to distance normal to a longitudinal axis of the hushing.

32. The bushing of claim 20, wherein the leading edge of the bushing is curved inward such that the leading edge is inside an extrapolated cylinder extending flush with the outer cylindrical surface, and wherein the trailing edge of the bushing is curved inward such that the leading edge is inside an extrapolated cylinder extending flush with the outer cylindrical surface.

33. An assembly configured to secure a first component to a second component, the assembly comprising:
   a fastener having a head integrally formed with a shaft; and
   a bushing comprising:

a cylindrical main body having a leading end and a trailing end, wherein a fastener passage is defined within said main body, said shaft being positionable within said fastener passage;

a plurality of lobes extending inward from the main body into the fastener passage and extending from the leading end to the trailing end; and first and second series of ribs outwardly extending from said main body, said first and second series of ribs being configured to securely anchor the bushing within an opening formed in the first component, wherein the first series of ribs is separated from the second series of ribs by a space in the longitudinal direction of the bushing, wherein each of the ribs has three sections, including a first section extending outwardly and downwardly from an outer cylindrical surface of the main body, a second section extending downwardly in an elongated fashion and axially from the first section, and a third section extending downwardly and inwardly from the second section.

34. The assembly of claim 33, further comprising the first component and the second component, wherein the bushing is configured to abut against the second component at the leading edge, and wherein the leading edge is a bearing surface relative to a surface of the second component contacting the leading edge when the fastener applies a force between the head and the second component, thereby securing the first component to the second component.

35. The assembly of claim 34, wherein the bushing is configured to abut against the head of the fastener, and wherein the trailing edge is a bearing surface relative to a surface of the head contacting the trailing edge when the fastener applies a tensile force between the head and the second component, thereby securing the first component to the second component.

36. The assembly of claim 35, wherein the first section extends at a rise to run that is no more than about one, wherein the rise corresponds to outward extension.

37. The assembly of claim 33, wherein outermost portions of the ribs comprise respective elongate smooth surfaces extending parallel to a longitudinal axis of the bushing.

38. The assembly of claim 33, wherein said plurality of ribs comprises a first column of ribs including a plurality of ribs, the first column being aligned with the longitudinal axis of the bushing.

39. The assembly of claim 38, wherein said plurality of ribs comprises a second column of ribs including a plurality of ribs, the second column being aligned with the longitudinal axis of the bushing and being spaced axially apart from the first column.

40. The assembly of claim 33, wherein the fastener is retained in the bushing.

41. The assembly of claim 33, wherein the bushing is interference fitted into the opening of the first component and wherein an outer diameter of the bushing is smaller than an inner diameter of the opening of the first component.

42. The bushing of claim 33, wherein the bushing has ends with maximum outer diameters that are the same.

43. The assembly of claim 33, wherein relative to portions of the bushing where a plane normal to a longitudinal axis of the bushing is away from the ribs, an interior diameter of the bushing increases at portions of the bushing where a second plane normal to the longitudinal axis of the bushing intersects the ribs.

44. The assembly of claim 33, wherein the bushing is a monolithic component, wherein the fastener is a monolithic component.

45. The assembly of claim 44, wherein the fastener applies a force between the head and the second component, thereby securing the first component to the second component such that the bushing abuts the head of the fastener, and the trailing edge is a bearing surface relative to a surface of the head contacting the trailing edge when the fastener applies a tensile force between the head and the second component, thereby securing the first component to the second component.

\* \* \* \* \*